US012791336B1

(12) United States Patent
Russell et al.

(10) Patent No.: US 12,791,336 B1
(45) Date of Patent: Nov. 10, 2026

(54) CRASH RISK SCORE ANALYSIS FOR FLEET MANAGEMENT

(71) Applicant: Samsara Inc., San Francisco, CA (US)

(72) Inventors: Jesse Rio Russell, Middleton, WI (US); Julia Yi-Hsin Lin, San Jose, CA (US); Katherine Anne Livins, Aptos, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/206,965

(22) Filed: May 13, 2025

(51) Int. Cl.
*G01C 21/34* (2006.01)
*G01C 21/36* (2006.01)

(52) U.S. Cl.
CPC ..... *G01C 21/3461* (2013.01); *G01C 21/3484* (2013.01); *G01C 21/3697* (2013.01)

(58) Field of Classification Search
CPC ............ G01C 21/3461; G01C 21/3484; G01C 21/3697
See application file for complete search history.

(56) References Cited

U.S. PATENT DOCUMENTS

| | | | | |
|---|---|---|---|---|
| 2016/0171521 A1* | 6/2016 | Ramirez | ................ | G06Q 10/04 701/409 |
| 2019/0005412 A1* | 1/2019 | Matus | .................... | G07C 5/085 |
| 2021/0164792 A1* | 6/2021 | Pal | ..................... | G01C 21/3453 |
| 2022/0018676 A1* | 1/2022 | Haugaard | .......... | G01C 21/3617 |
| 2022/0155796 A1* | 5/2022 | Haidar | .................... | H04W 4/40 |
| 2023/0025772 A1* | 1/2023 | Crosby | .............. | G01C 21/3461 |
| 2024/0377211 A1* | 11/2024 | Williams | ........... | G01C 21/3484 |
| 2025/0085135 A1* | 3/2025 | Collins | ................ | G08G 1/0141 |

* cited by examiner

*Primary Examiner* — Rami Khatib
(74) *Attorney, Agent, or Firm* — Schwegman Lundberg & Woessner, P.A.

(57) ABSTRACT

Methods, systems, and computer programs are presented to provide risk insights based on crash risk scores. The described solution addresses the challenge of reducing vehicle crashes and prioritizing safety interventions by utilizing a behavioral monitoring system (BMS) that calculates crash risk scores at the trip, driver, and organizational levels. The system employs machine learning models trained on historical data, incorporating features such as trip characteristics, driver history, and organizational safety practices. Risk scores are aggregated to provide actionable insights, enabling fleet managers to identify high-risk drivers, optimize routes, and implement targeted coaching or training. The solution improves safety performance, reduces crashes, and enhances resource allocation efficiency. The calculated risk scores and insights are presented via user interfaces, offering visualizations and recommendations for safety interventions.

20 Claims, 12 Drawing Sheets

PROVIDING RISK INSIGHTS BASED ON CRASH RISK SCORES

PROVIDING RISK INSIGHTS BASED ON CRASH RISK SCORES

CRASH RISK SCORE ANALYSIS FOR FLEET MANAGEMENT

TECHNICAL FIELD

The subject matter disclosed herein generally relates to methods, systems, and machine-readable storage media for improving driver safety and providing tools for fleet management.

BACKGROUND

In the area of driver safety and risk management, organizations face the challenge of reducing vehicle crashes and effectively prioritizing safety interventions. Crashes are costly, both financially and operationally, for organizations managing vehicle fleets. Additionally, fleet managers often lack a systematic method to identify high-risk drivers and allocate resources for targeted coaching or training. This results in inefficiencies in addressing safety concerns and mitigating risks.

Sometimes, organizations experience a high frequency of crashes, which are difficult to predict and prevent without actionable insights. Further, there is an absence of a reliable mechanism to rank drivers based on their risk levels, making it challenging to determine which drivers require immediate attention. For example, fleet managers may not have sufficient data to identify drivers with a history of unsafe behaviors, such as being in accidents, speeding, distracted driving, or frequent safety events. This lack of prioritization leads to suboptimal safety interventions.

Further, organizations face increased costs due to crashes, potential harm to drivers, and reputational damage. The inability to identify high-risk drivers in a timely manner reduces the effectiveness of safety programs and training initiatives. This can lead to a perpetuation of unsafe driving behaviors and an overall decline in fleet safety performance.

BRIEF DESCRIPTION OF THE DRAWINGS

Various appended drawings illustrate examples of the present disclosure and cannot be considered limiting its scope.

DETAILED DESCRIPTION

Figure 1:
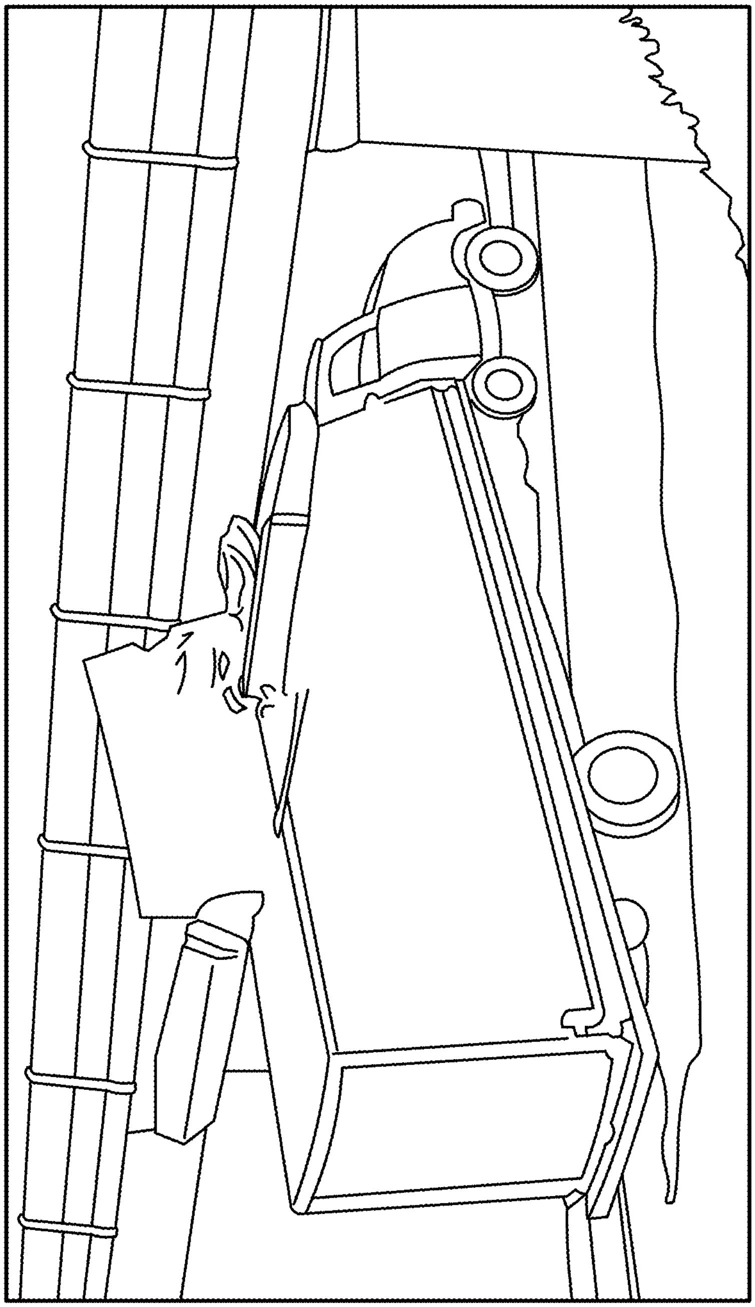
FIG. 1 shows a truck hitting a bridge with low clearance.

Example methods, systems, and computer programs described herein are directed at providing risk insights based on crash risk scores. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

In one aspect, a behavioral monitoring system (BMS) and methodology for assessing and managing driver risk within fleet operations are presented. The BMS is based on a model that evaluates risk at the trip level and aggregates this data to provide risk scores at the driver and organizational levels. The system leverages data collected from various sources, including trip characteristics, driver history, and organizational safety practices, to generate actionable insights for fleet managers.

In some examples, a trip represents the period during which a vehicle is active, from the time it starts to the time it stops. Trip data includes parameters such as maximum speed, instances of speeding, and environmental factors like temperature at the start of the trip. Additional data points include the frequency of trips within specific timeframes, such as the number of trips in the last day or the total driving distance over the past 30 days. This granular trip-level data is used for the risk analysis.

Driver-level data is incorporated into the model to account for historical safety events and behavioral tendencies. Organizational-level data is also considered, including the history of crashes, safety events, and the presence of safety measures such as dual-facing cameras. These features are selected based on their relevance to safety outcomes and are refined through modeling processes.

In some examples, a trip model is created to process trip-level data and determine a crash risk score indicating a relative likelihood of a crash during a trip. This determination is based on crash detection algorithms that utilize AI models and human-labeled ground truth data. The trip-level risk scores are then aggregated to generate driver-level indicators. These indicators reflect the risk associated with a driver's recent trips or driving patterns over a specified period. Similarly, organizational-level risk scores are calculated by aggregating data across drivers and trips within the organization and could additionally incorporate other organization-level data.

By analyzing historical and real-time data, the model identifies patterns and trends that correlate with unsafe driving behaviors and conditions. The aggregation of trip-level data to driver and organizational levels ensures a comprehensive assessment of risk across multiple dimensions.

Glossary of Terms

Some of the concepts used for the description of the solution are presented below.

A crash risk score is a numerical value representing the relative likelihood of a crash occurring during a specific trip.

Driver data is information associated with a driver, such as historical safety events, driving patterns, and metrics from previous trips.

A driver-specific risk indicator is an aggregated metric derived from crash risk scores of multiple trips associated with a driver, reflecting the overall risk profile of the driver.

A machine learning model is a computational algorithm trained on historical data to identify patterns and predict outcomes, such as crash risk scores, based on input features.

A planned trip is a defined journey for a vehicle, including a start point, an end point, and associated trip details such as driver and vehicle information.

Trip-level data is information specific to a single trip, such as maximum speed, instances of speeding, environmental conditions, and trip duration.

A user interface is a graphical or textual display configured to present information, such as crash risk scores, contributing factors, and actionable recommendations to fleet managers or users.

An actionable recommendation is a suggestion aimed at mitigating risk through interventions such as coaching, training, or route adjustments.

Environmental data is information related to external conditions affecting a trip, including weather, road type, and traffic patterns, used to refine crash risk calculations.

An organizational crash risk score is an aggregated metric representing the overall relative likelihood of crashes across drivers, vehicles, and trips within an organization.

Organizational-level data is aggregated information about an organization, such as safety records, crash history, and implemented safety measures.

A route risk score is a calculated metric representing the relative likelihood of crashes for a specific route.

A visual representation is a graphical depiction of crash risk scores, such as charts, graphs, or heatmaps, displayed on a user interface to contextualize risk factors.

A fleet management system is a software or hardware platform configured to monitor, analyze, and optimize vehicle and driver operations within an organization.

FIG. 1 shows a truck hitting a bridge with low clearance. The techniques presented calculate crash risk scores on different dimensions, such as trip, driver, and organization. Different types of crashes are included, such as colliding with another vehicle, veering off the road, hitting the bridge, colliding with fixed obstacles, etc.

In some examples, the crash risk score, also referred to herein as the risk score, is a relative likelihood of a crash. The risk score may be calculated for a given trip, a given driver, or for the organization as a whole during a predetermined period.

In other examples, the risk score represents the relative likelihood of a crash, where a trip with a higher risk score than another trip will indicate a higher risk than the other trip. Crashes are low-probability events for trips of a fleet, meaning that even a high relative risk score may correspond to a low probability of a crash.

The risk score, in some examples, is calculated using a machine-learning (ML) model. In some examples, for simplicity, a small number of features are used to calculate the risk score with the goal of being able to provide explanations on how the scores are calculated. For example, some of the risk factors may include a history of past safety events associated with crashes.

A history of safety events tends to be indicative of future crash risk. A list of risk factors may be included to calculate the risk score. Additionally, a relative importance or score may be assigned to each factor. The following are a set of risk factors, with their corresponding importance, that may be used for the analysis of the risk score in any combination:

Driver total safety events, prior 1 day, at least one −0.32;

Organization count of harsh crash events, prior 30 days −0.16;

Organization history sharp turn events, prior 30 days −0.10;

Organization count of safety events, prior 30 days −0.09;

Trip max speed −0.08;

Driver total trips completed, prior 1 day −0.06;

Organization history, camera misaligned events, prior 30 days −0.05;

Driver history of harsh braking in prior 7 days, more than one−0.05;

Organization history seat belt policy events, prior 30 days −0.03;

Organization count of distracted driving events, prior 30 days −0.03;

Organization count of driver obstruction policy, prior 30 days −0.01;

Driver history of rolled stop signs, prior 30 days, more than zero −0.01; and

Driver total driving duration, prior 30 days −0.0004

A list of risk factors used to calculate risk scores for drivers includes any combination of the following:

Driver total safety events, prior 1 day, at least one −0.45;

Trip max speed−0.11;

Driver total safety events, prior 30 days −0.10;

Driver history of harsh braking in prior 7 days, at least one −0.06;

Driver total trips completed, prior 1 day −0.06;

Driver history of camera misalignment events, prior 30 days −0.05;

Driver history of seat belt policy events, prior 30 days −0.04;

Driver history of crash events, prior 30 days −0.04;

Driver total driving duration, prior 30 days −0.03;

Driver history of sharp turn events, prior 30 days −0.02;

Driver history of driver obstruction policy events, prior 30 days −0.02;

Driver history of distracted driving events, prior 30 days −0.01; and

Driver history of rolled stop signs, prior 30 days, more than zero −0.01

It is noted that all the factors may be used, or any combination of two or more factors may be used to model crash risk.

A risk model accounts for different values of features, such as information about each trip, the history of safety events of the driver, the organizational history of safety events, environmental factors such as temperature (e.g., at the beginning of the trip, at the end of the trip, highest temperature during the trip), and organization-level factors such as the use of rear-facing cameras.

In some examples, the model predicts a risk score that represents the relative likelihood that a crash will occur for a given trip. Likelihood refers to how probable some observed data is, given a specific model or set of parameters.

The model is trained based on a history of trips and crashes. The trip-level scores are aggregated to provide driver-level scores based on recent trips. The risk score can be used to identify patterns in risky trips, highlight drivers needing intervention, track risk exposure over time, and target safety initiatives at the organizational level.

Using some existing data for hundreds of millions of trips, an analysis of crash risk was performed. For trips, the analysis for this particular data revealed that most trips are low risk, but high-risk trips are significantly riskier than the average. For example, the top 5% of trip scores had a crash likelihood over 600 times greater than the bottom 5%. It is noted that other data may produce different statistical values.

Analysis was also performed for drivers, and the results showed that most drivers are typically safe, but certain driver-days are notably riskier than the average. For example, the top 5% of driver-day scores were over 240 times more likely to experience a crash than the bottom 5% of drivers.

At the organizational level, the relationship between risk scores and crash likelihood was less pronounced but still discernible. Trips for organizations in the top 5% of risk scores are over 16 times more likely to experience a crash than those in the bottom 5%.

Therefore, identifying high-risk scores (per trip, driver, or organization) may help companies improve safety and reduce crashes.

The solution addresses the technical challenges of prioritizing safety interventions and reducing crashes. It provides fleet managers with a systematic method to rank drivers based on risk and allocate resources effectively. The trip model targets specific components, such as trip characteristics, driver behaviors, and organizational practices, to deliver actionable insights.

The expected outcomes of the solution include a reduction in crashes, improved safety performance, and more efficient allocation of training and coaching resources. Fleet managers can use the insights to focus on high-risk drivers and implement targeted interventions. The system also enables organizations to monitor their overall risk levels and track changes over time.

Figure 2:
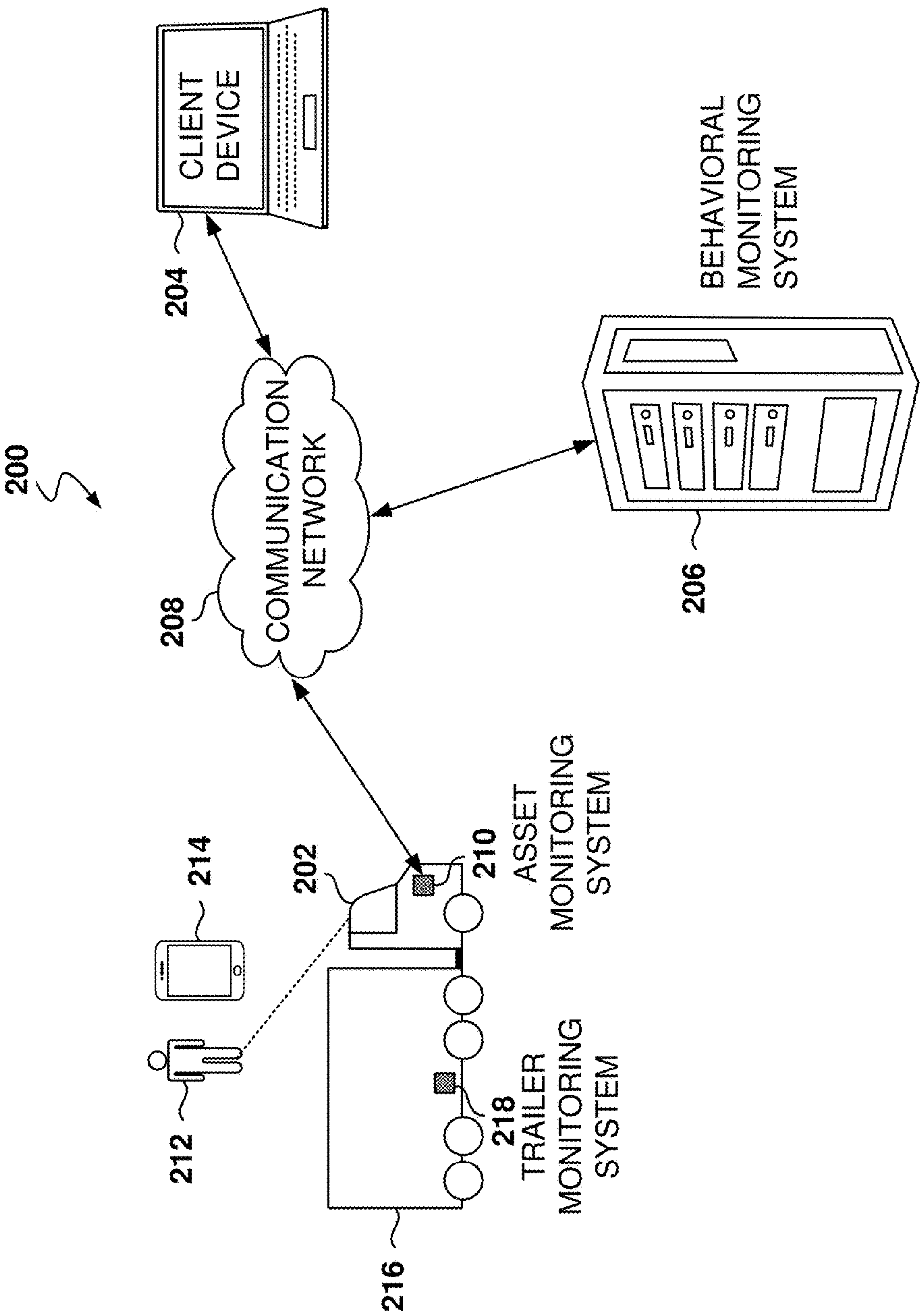
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, trailer 216, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS 210) that allows for monitoring events at the vehicle and exchanging information and commands between the vehicle 202 and one or more remote computing devices via the communication network 208. In some examples, the AMS includes a communications device (also referred to as a vehicle gateway) and a camera device. The trailer 216 includes a TMS 218 that allows for monitoring events at the trailer and exchanging information and commands between the trailer 216 and other computing devices (e.g., the behavioral monitoring system 206, the AMS 210) via the communication network 208. In some examples, the TMS 218 includes an asset gateway, which is a device installed in the trailer for capturing data and sending the data to the BMS.

The AMS 210 may include one or more hardware devices to perform monitoring functions at the vehicle, such as a communications device and a camera device, but other configurations are also possible.

The AMS 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages, and interact with any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a standalone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicate the occurrence of an undesirable behavior or a critical event such as a collision. For example, a triggering condition may be satisfied when a truck approaches a bridge with lower clearance than the height of the truck or the trailer. As another example, a triggering condition may define unsafe lane-departure events.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior.

Further, a driver 212 may interact with the behavioral monitoring system 206 and the AMS 210 via a mobile device 214. A BMS application (app) may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
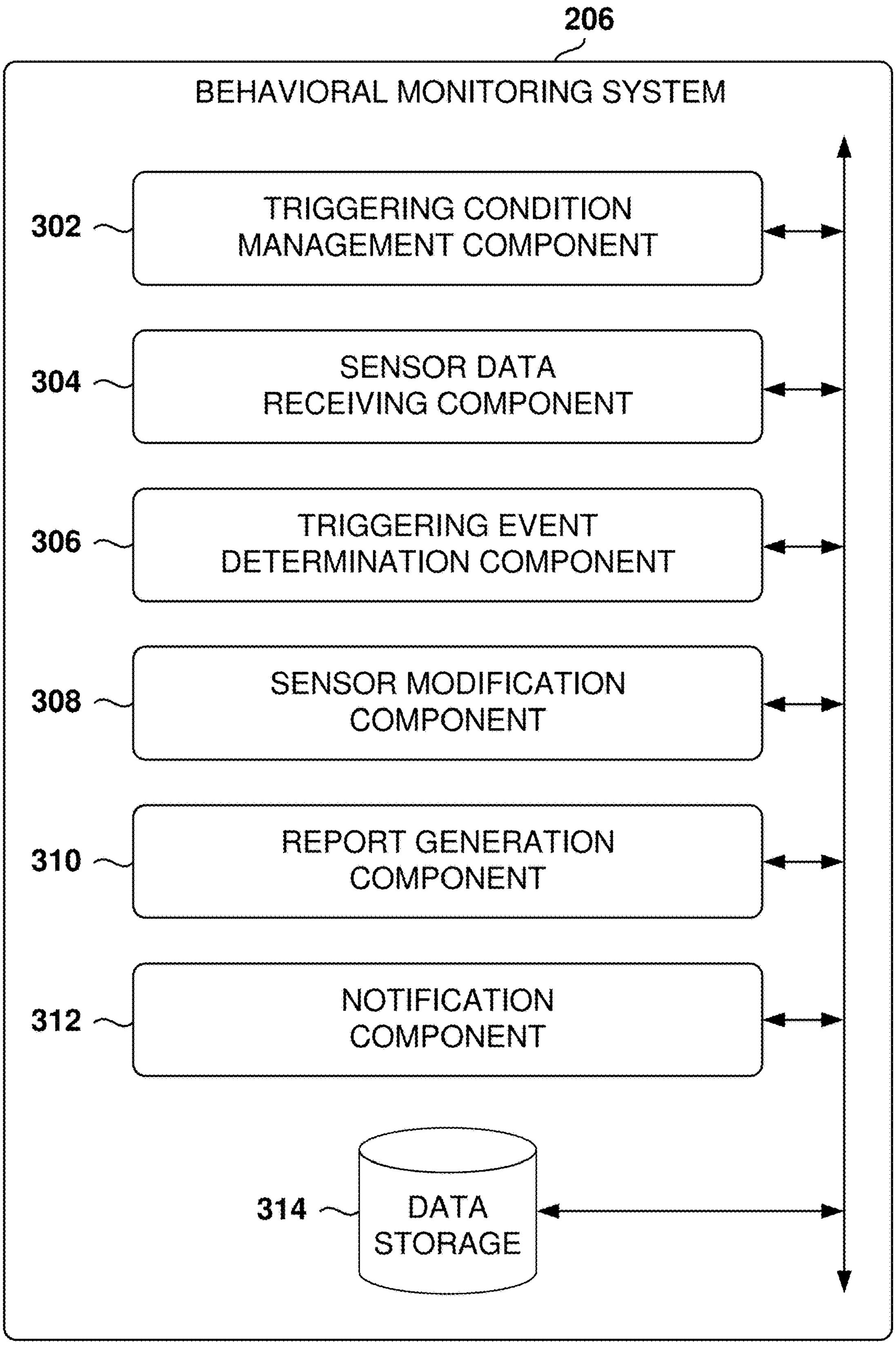
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, the triggering condition management component 302 provides a graphical user interface that allows administrators to generate and modify triggering conditions. Each triggering condition defines one or more individual conditions that, if satisfied, indicate the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, that prompt a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition is met. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, tampering, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, or the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
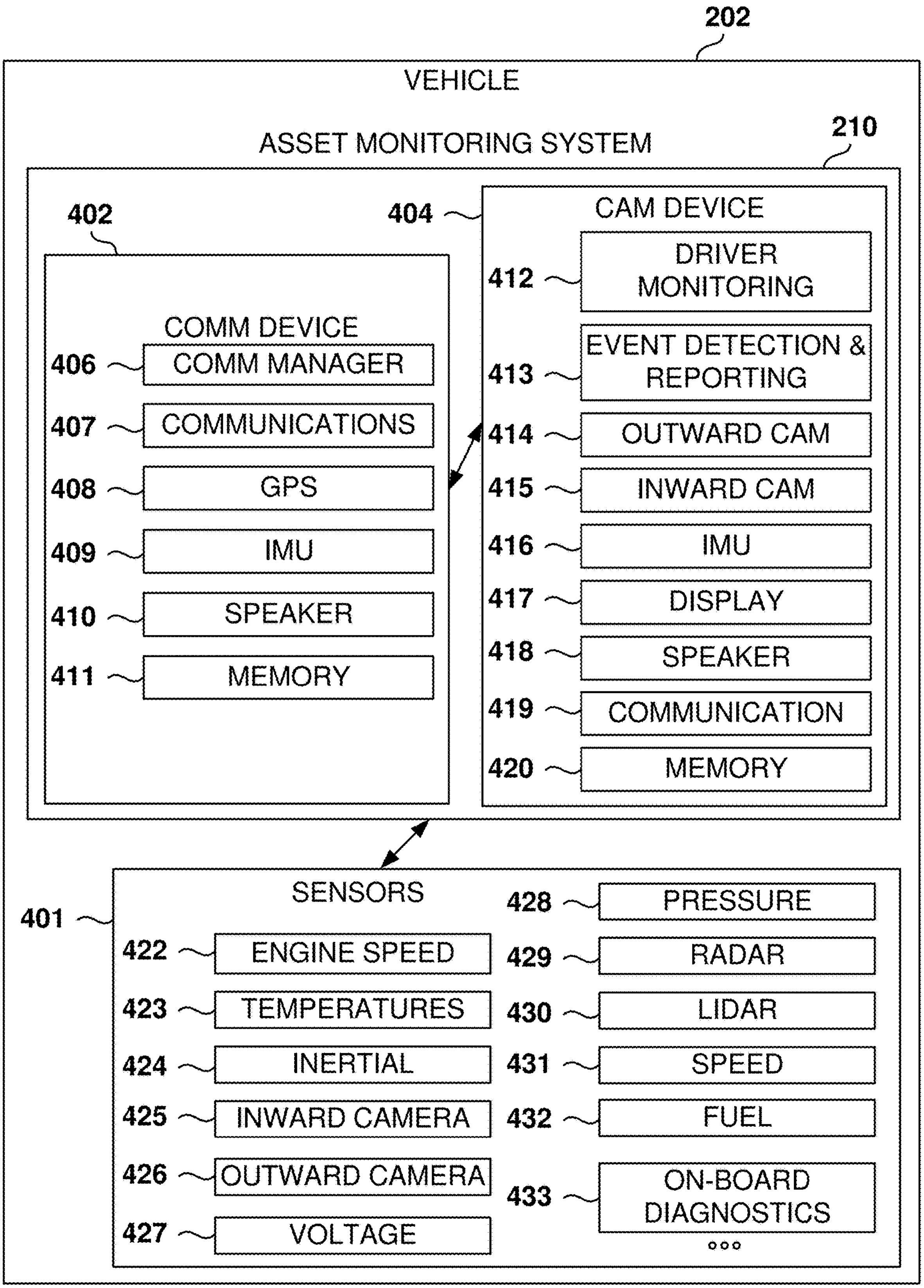
FIG. 4 illustrates the components of a vehicle for rider behavioral monitoring, according to some examples.

FIG. 4 illustrates components of a vehicle 202 for rider behavioral monitoring, according to some examples. The vehicle 202 includes the AMS 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a communication (comm) device 402 and a camera (cam) device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, an Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring module 412, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring module 412 performs one or more activities regarding driver behavior, such as LD detection, driving while drowsy, following too close, sudden braking, etc. The event detection and reporting system 413 is configured to identify and log significant events based on sensor data. For example, the event detection and reporting system 413 may detect when the truck is approaching a bridge, and there is a risk of collision. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an onboard diagnostics system 433 for self-diagnosis and reporting of the operational status of the vehicle 202.

Figure 5:
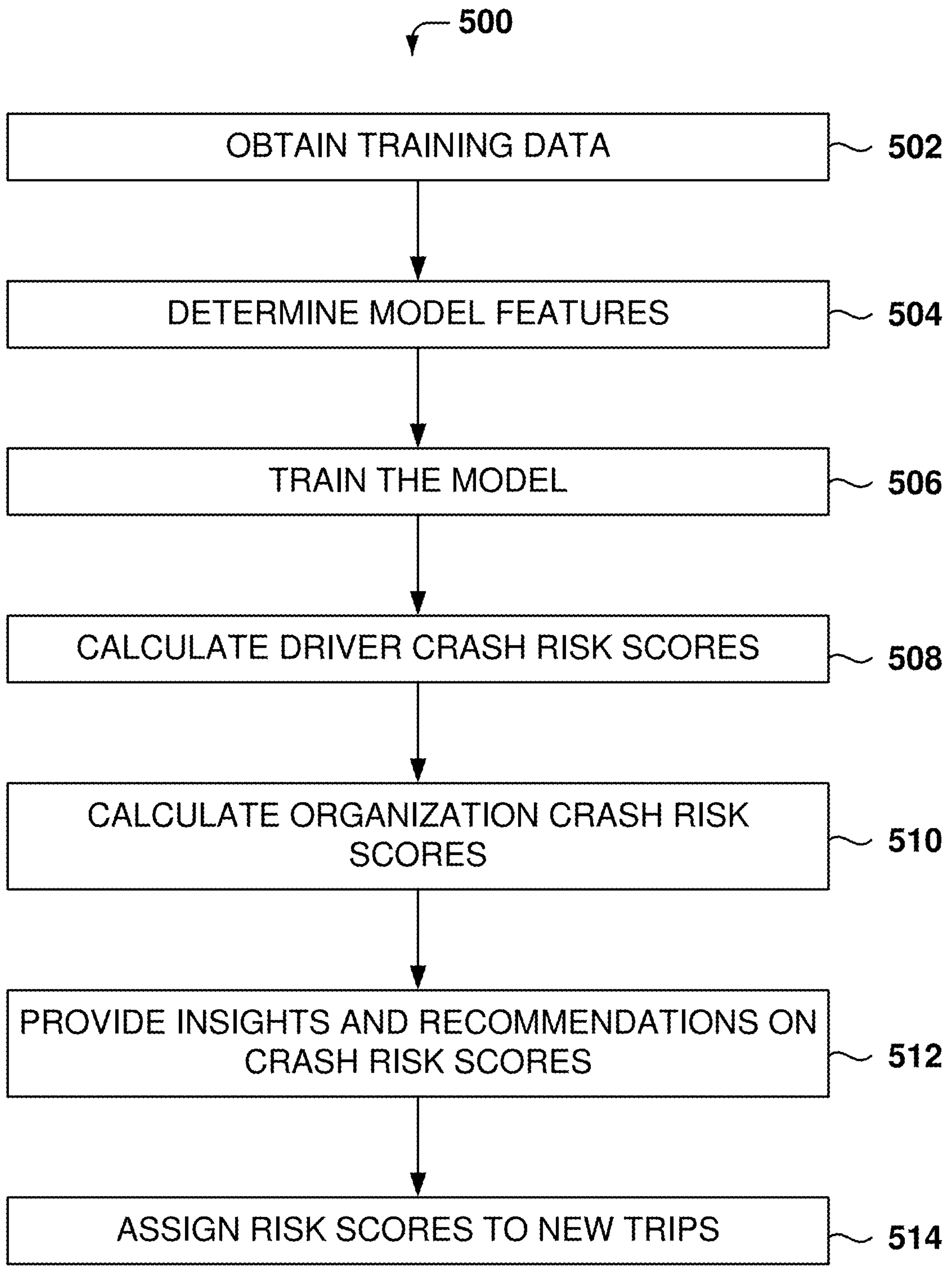
FIG. 5 is a flowchart of a method for providing risk insights based on crash risk scores, according to some examples.

FIG. 5 is a flowchart of a method 500 for providing risk insights based on crash risk scores, according to some examples. The method comprises operations that process data to generate actionable insights for fleet management systems. While the various operations in this flowchart are presented and described sequentially, one of ordinary skill will appreciate that some or all of the operations may be executed in a different order, be combined or omitted, or be executed in parallel.

At operation 502, training data is obtained, collecting data to train a machine learning model. In some examples, the data includes trip-level, driver-level, and organizational-level information. Examples of trip-level data include maximum speed, instances of speeding, and environmental conditions such as temperature. Driver-level data may include historical safety events, such as harsh braking, distracted driving, and seatbelt usage. Organizational-level data may encompass aggregated safety records, such as crash history and the presence of safety measures like rear-facing cameras.

The concept of a "trip" is a data organization construct. In some examples, a trip is defined as the period from when a vehicle starts, operates for any duration, moves to a location, and then stops. The length and complexity of a trip can vary significantly, ranging from a short delivery route within a block to a long-distance highway journey. The trip data encompasses various elements, including start time, start location, end location, and potentially intermediate locations, as well as timestamps for the trip events or markers.

In some examples, the trip data also includes the maximum speed reached during the trip as an indicator of the driving style. Additional factors considered include instances of speeding, the temperature at the trip's start, the number of trips a driver has taken in the last day, and the total driving time accumulated by a driver over the past 30 days.

From operation 502, the method flows to operation 504 to determine the model features. The features that will be used to train the model are identified. The features are chosen based on their relevance to predicting crash risk. Statistical analysis and machine learning techniques, such as correlation analysis or feature importance ranking, may be employed to refine the feature set. The selected features are then standardized and normalized to ensure consistency across the dataset.

From operation 504, the method flows to operation 506 to train the ML model. The machine learning model is trained using the prepared training data and selected features. The model employs algorithms, such as logistic regression, random forests, or neural networks, to learn patterns and relationships within the data. In some examples, the training process involves splitting the data into training and validation sets, optimizing hyperparameters, and evaluating the model's performance using metrics like precision, recall, and F1 score. The trained model is configured to predict the crash risk score at the trip level based on the input data, including any combination of information about the trip, the driver, and the organization.

From operation 506, the method flows to operation 508 to calculate driver crash risk scores. In this operation, the trained model is applied to trip-level data to generate risk scores for individual trips of a driver. These trip-level scores are then aggregated to calculate driver-level crash risk scores. Aggregation methods may include weighted averaging or summation of trip-level scores over a specified period, such as the last 30 days. The resulting driver-level scores provide an indicator of a driver's risk based on their driving patterns and safety history.

In some examples, the trip model incorporates driver-specific historical data. This includes the driver's speeding history and records of various safety events such as tailgating, phone usage while driving, harsh braking, sharp turns, seatbelt usage, distracted driving incidents, and rolling stops. The analysis extends beyond individual drivers to also consider organizational-level data, including the organization's history of crashes and instances of drowsy driving.

In some examples, the risk assessment is performed at both the trip and driver levels. Initially, risk is calculated for individual trips. These trip-level risk assessments are then aggregated to produce a driver-level risk indicator. The driver-level indicator is based on an aggregation of the risk assessments from the driver's recent trips or recent days of driving.

From operation 508, the method flows to operation 510 to calculate organization crash risk scores. At this stage, the method aggregates driver-level risk scores across drivers within an organization to compute an organizational crash risk score. This score reflects the overall safety performance of the organization and accounts for factors such as the frequency of high-risk trips and the distribution of risk among drivers. In some examples, statistical methods are used to ensure that the organizational score accurately represents the aggregated risk.

From operation 510, the method flows to operation 512 to provide insights and recommendations on crash risk scores. The calculated risk scores are analyzed to generate actionable insights for fleet managers. These insights may include identifying high-risk drivers, assessing organizational safety trends, and recommending targeted interventions such as coaching or training.

In some examples, insights are calculated in a batch mode, where data is processed offline to generate insights for fleet managers. The batch processing workflow involves scheduling the model to run at regular intervals, such as daily or weekly, to analyze the latest data and update risk scores. This operation may use data pipeline tools such as Apache Airflow or AWS Batch to automate the processing workflow.

In some examples, the insights are presented on a computer user interface, which may include visualizations like charts and tables to contextualize the risk scores and highlight areas for improvement.

From operation 512, the method flows to operation 514, to assign risk scores to new trips. In this operation, the trained model is used to assign risk scores to new trips as they occur. This enables real-time or near-real-time assessment of trip-level risk, allowing fleet managers to monitor ongoing operations and make informed decisions. The assigned risk scores can also be used to update driver-level and organizational-level scores, ensuring that the system remains current with the most recent data.

The solution leverages data-driven insights to predict and mitigate risk. By analyzing historical and real-time data, the model identifies patterns and trends that correlate with unsafe driving behaviors and conditions. The aggregation of trip-level data to driver and organizational levels ensures a comprehensive assessment of risk across multiple dimensions. The expected outcomes include a reduction in crashes, improved safety performance, and more efficient allocation of training and coaching resources.

Figure 6:
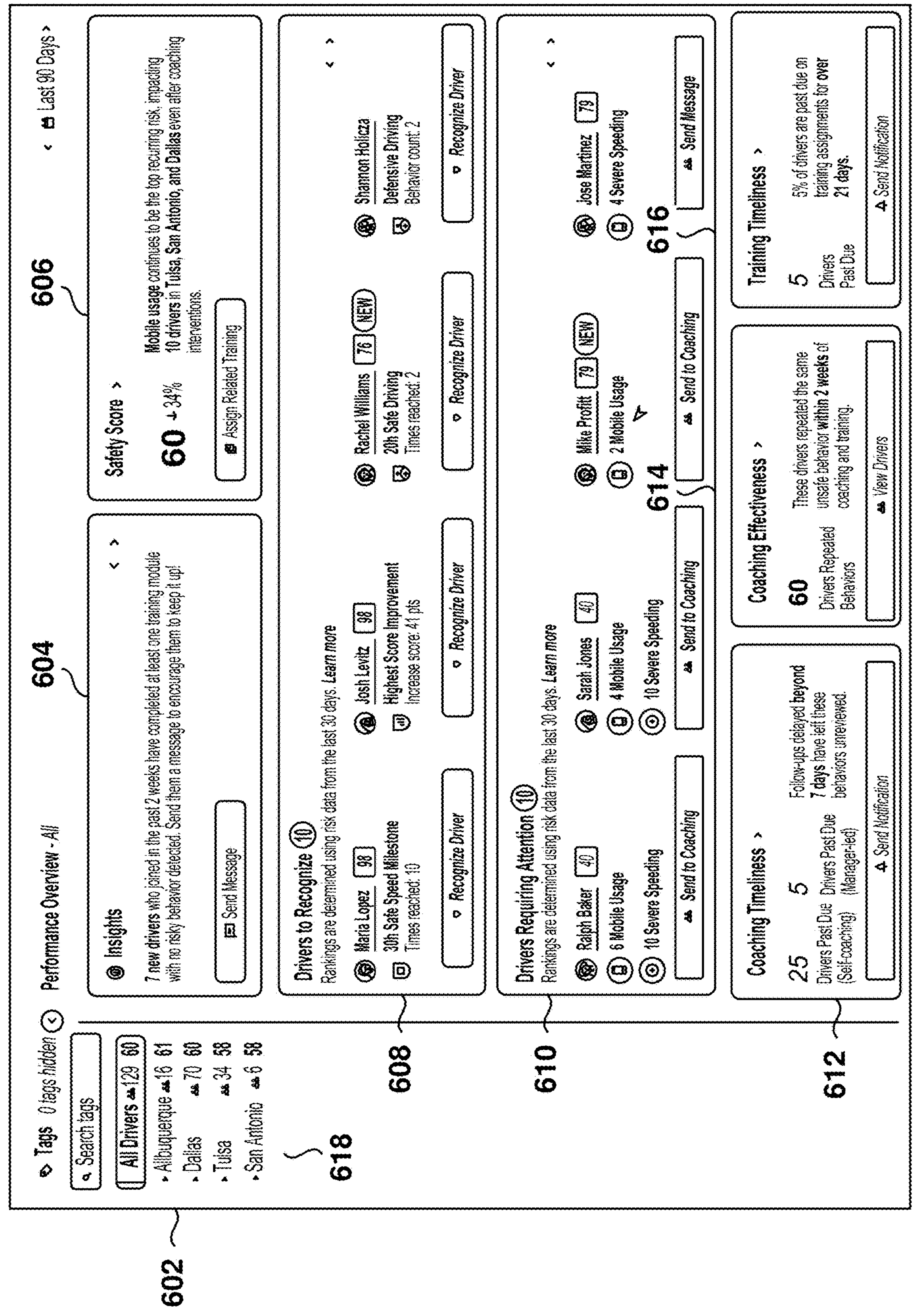
FIG. 6 is a User Interface (UI) for performance review based on crash risk scores, according to some examples.

FIG. 6 is a UI 602 for performance review based on the crash risk scores, according to some examples. One application of the crash risk model is the identification of high-risk drivers. The UI 602 provides an overview of drivers requiring attention, highlighting those with the highest risk scores. This overview includes contextual information such as the drivers' safety event history. This feature enables safety managers to identify which drivers require focused attention or intervention.

The UI 602 is an example interface that highlights drivers requiring attention. The UI 602 identifies high-risk drivers and provides context about their safety event history, enabling fleet managers to prioritize interventions.

The UI 602 is designed to provide fleet managers with actionable insights and tools for monitoring and improving driver safety and organizational risk levels.

A navigation panel 618 is positioned on the left side of the UI 602. The navigation panel 618 offers options for filtering data by tags, such as city names or fleet identifiers. In some examples, the navigation panel 618 incorporates a search input field that enables users to find particular tags or categories. The navigation panel 618 presents a list of tags along with numerical values that represent the number of drivers or events associated with each tag.

An insights 604 field is presented at the top center of the UI 602. The insights 604 field provides a summary of insights related to driver performance and safety. In the illustrated example, the insights 604 field displays a message indicating the number of drivers who have completed training modules within a specified timeframe. A button labeled "Send Message" is included to enable fleet managers to communicate with drivers directly through the interface.

A safety score module 606 is located adjacent to the insights 604 overview section. The safety score module 606 displays a numerical safety score representing the overall risk level of the organization or fleet. In some examples, the safety score module 606 includes a description of recurring risk factors, such as mobile usage, and their impact on specific locations or fleets. A button labeled "Assign Related Training" is provided to allow fleet managers to initiate training interventions for drivers associated with high-risk behaviors.

A drivers-to-recognize section 608 is situated below the performance overview section. The drivers to recognize section 608 lists drivers who have demonstrated notable improvements in safety metrics, such as reduced speeding or increased seatbelt usage. Each driver entry includes the driver's name, a description of their achievement, and a button labeled "Recognize Driver" to acknowledge their performance.

A drivers-requiring-attention section 610 is positioned below the drivers-to-recognize section 608. The drivers requiring attention section 610 identifies drivers with high-risk behaviors or safety event histories that require intervention. Each driver entry includes the driver's name, a description of their risk factors, such as mobile usage or severe speeding, and a button labeled "Send to Coaching" for assigning targeted coaching sessions.

A coaching timelines section 612 is located at the bottom left of the interface and provides data on the timeliness of coaching interventions. In some examples, the module displays the number of drivers who have overdue follow-ups beyond a specified timeframe. A button labeled "Send Notification" is included to enable fleet managers to remind drivers or coaches about pending follow-ups.

A coaching effectiveness module 614 is positioned adjacent to the coaching timelines module and displays metrics related to the success of coaching interventions, such as the number of drivers who have retained safe driving behaviors within a defined period. In some examples, a button labeled "View Drivers" is provided to allow fleet managers to access detailed information about the drivers included in the effectiveness metrics.

A training timelines module 616 is located next to the coaching effectiveness module and provides data on the timeliness of training assignments. In some examples, the module displays the number of drivers who are past due on training assignments for a specified period. A button labeled "Send Notification" is included to enable fleet managers to remind drivers about overdue training sessions.

The UI 602 integrates multiple components to provide a comprehensive view of driver performance, safety metrics, and intervention effectiveness. Each component is designed to facilitate specific actions, such as recognizing achievements, addressing high-risk behaviors, and monitoring the impact of coaching and training programs.

Figure 7:
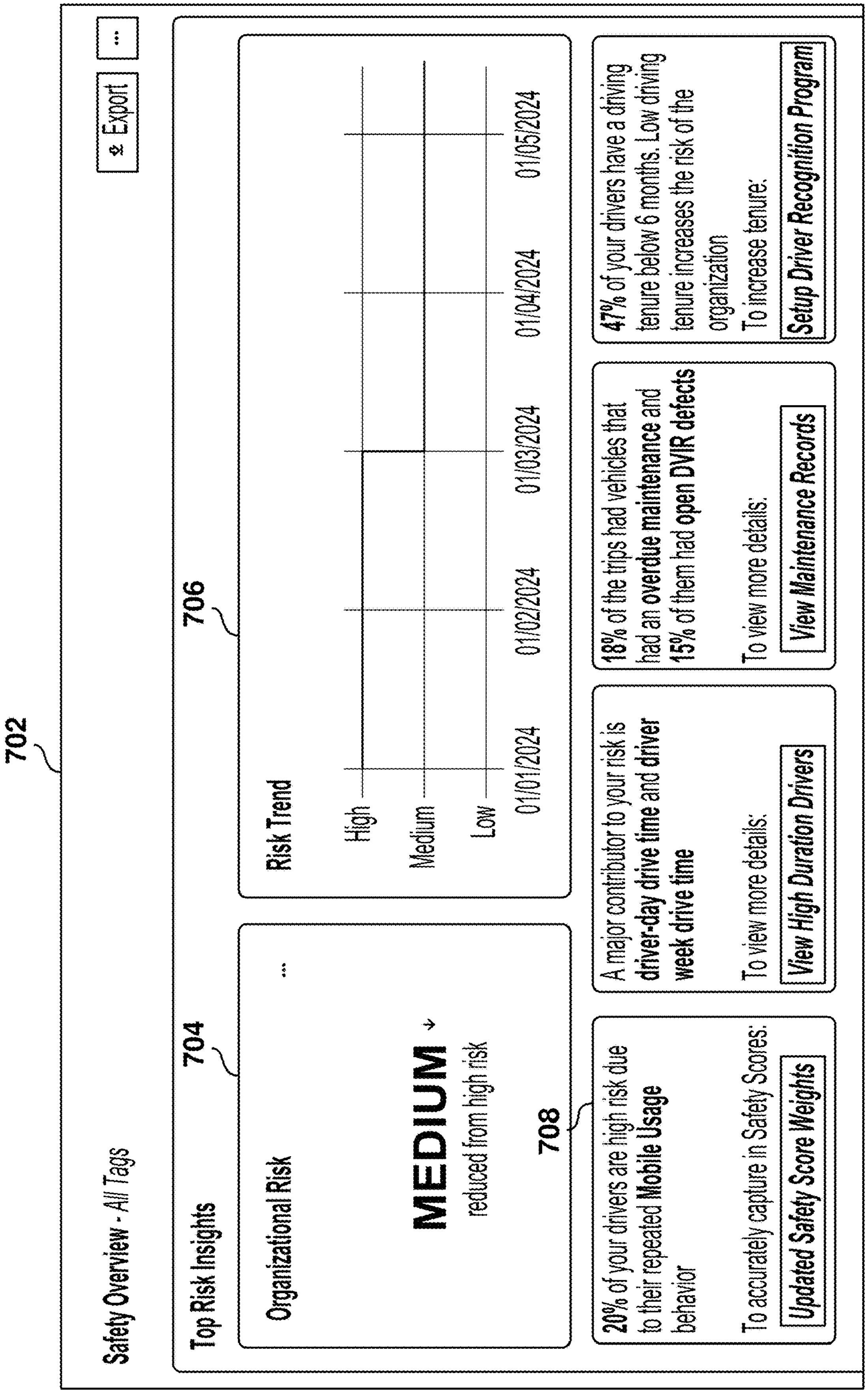
FIG. 7 is a UI for safety overview, according to some examples.

FIG. 7 is a UI 702 for safety overview, according to some examples. The UI 702 is designed to provide fleet managers with insights into organizational risk levels, trends over time, and actionable recommendations for improving safety metrics.

An organizational risk score 704 displays the current risk level of the organization. The organizational risk score 704 refers to the aggregated likelihood of crashes occurring across drivers, vehicles, and trips within an organization over a specified period. The organizational risk score 704 is derived from analyzing various factors that influence safety performance at the organizational level, such as historical crash data, the frequency of high-risk trips, and the distribution of risk among drivers.

The organizational risk score 704 provides a comprehensive view of the overall safety performance of the organization. It enables fleet managers to identify trends, assess the effectiveness of safety programs, and implement targeted interventions to reduce crash likelihood. For example, organizations with higher risk scores may prioritize coaching for high-risk drivers, adjust operational policies, or implement additional safety technologies to mitigate risk.

In some examples, the organizational risk score 704 is presented as a textual representation of the risk level (e.g., medium) from a plurality of categories (e.g., very low, low, medium, high, very high). The UI 702 further includes an indication of whether the risk level has changed, such as "reduced from high risk."

A risk trend chart 706 provides a graphical representation of the organization's risk level over time. In some examples, the risk trend chart 706 includes a line graph with axes representing time and risk level, where the risk level is categorized into "High," "Medium," and "Low." The graph allows fleet managers to observe changes in risk levels over time, enabling them to identify patterns or trends that may require intervention.

An actionable insights section 708 presents specific recommendations based on the analysis of risk factors. In some examples, the actionable insights section 708 includes multiple fields, each highlighting a particular risk factor and the associated impact. For instance, one field may indicate that "20% of your drivers are high risk due to their repeated mobile usage behavior," while another may state that "18% of the trips had vehicles with overdue maintenance and 15% of the trips had open DVIR defects," where DVIR stands for Driver Vehicle Inspection Report. Each field includes a corresponding action, such as "Update safety score weights" or "View maintenance records," which fleet managers can select to address the identified risk factors.

Figure 8:
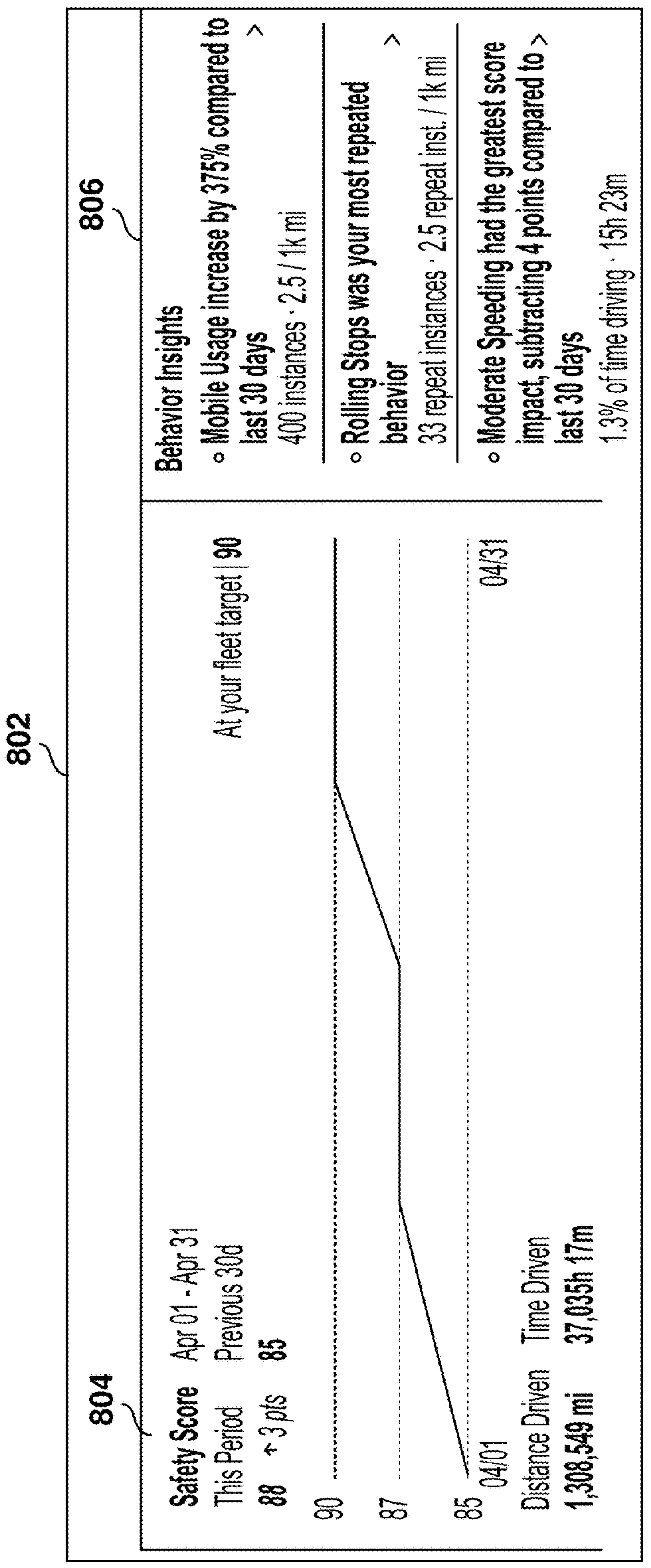
FIG. 8 is a UI showing the value of a safety score over time and behavior insights, according to some examples.

FIG. 8 is a UI 802 showing the value of the safety score over time and behavior insights, according to some examples. The UI 802 is designed to provide fleet managers with a comprehensive view of safety scores, trends, and actionable insights derived from driver behavior data.

A safety score section 804 is positioned on the left side of the interface and displays the safety score for the current period (e.g., 88) and compares this score to the previous 30-day period (e.g., 85), along with an indication of the change in score, e.g., "+3 pts." The safety score section 804 also includes a graphical representation of the safety score trend over time, depicted as a line graph. The graph is annotated with significant dates, such as "04/01" and "04/21," and includes a target safety score, such as "90," represented as a dashed line. Additional metrics, such as "Distance Driven" and "Time Driven," are displayed below the graph, providing contextual information about the fleet's activity during the specified period. For example, the distance driven is shown as "1,308,549 mi," and the time driven is shown as "37,035 h 17 m."

A behavior insights section 806 is located on the right side of the interface and provides detailed insights into driver behaviors that have impacted the safety score. In some examples, the behavior insights section 806 includes several entries, each highlighting a specific behavior and its associated impact. For instance, one entry indicates that "Mobile usage increased by 375% compared to last 30 days," with additional details such as "400 instances" and "2.5/k mi." Another entry identifies "Rolling stops" as the most repeated behavior, with "33 repeat instances" and "2.5 repeat inst./k mi" provided as supporting data. A third entry notes that "Moderate speeding had the highest score impact, subtracting 4 points compared to last 30 days," with further details such as "1.3% of time driving" and "15 h 22 m." Each entry includes an option, represented as an arrow, to access more detailed information or take specific actions related to the identified behavior.

The UI 602 provides a unified view of safety performance and contributing factors. The combination of numerical data, graphical trends, and detailed behavior insights enables fleet managers to monitor safety metrics, identify areas for improvement, and implement targeted interventions.

Figure 9:
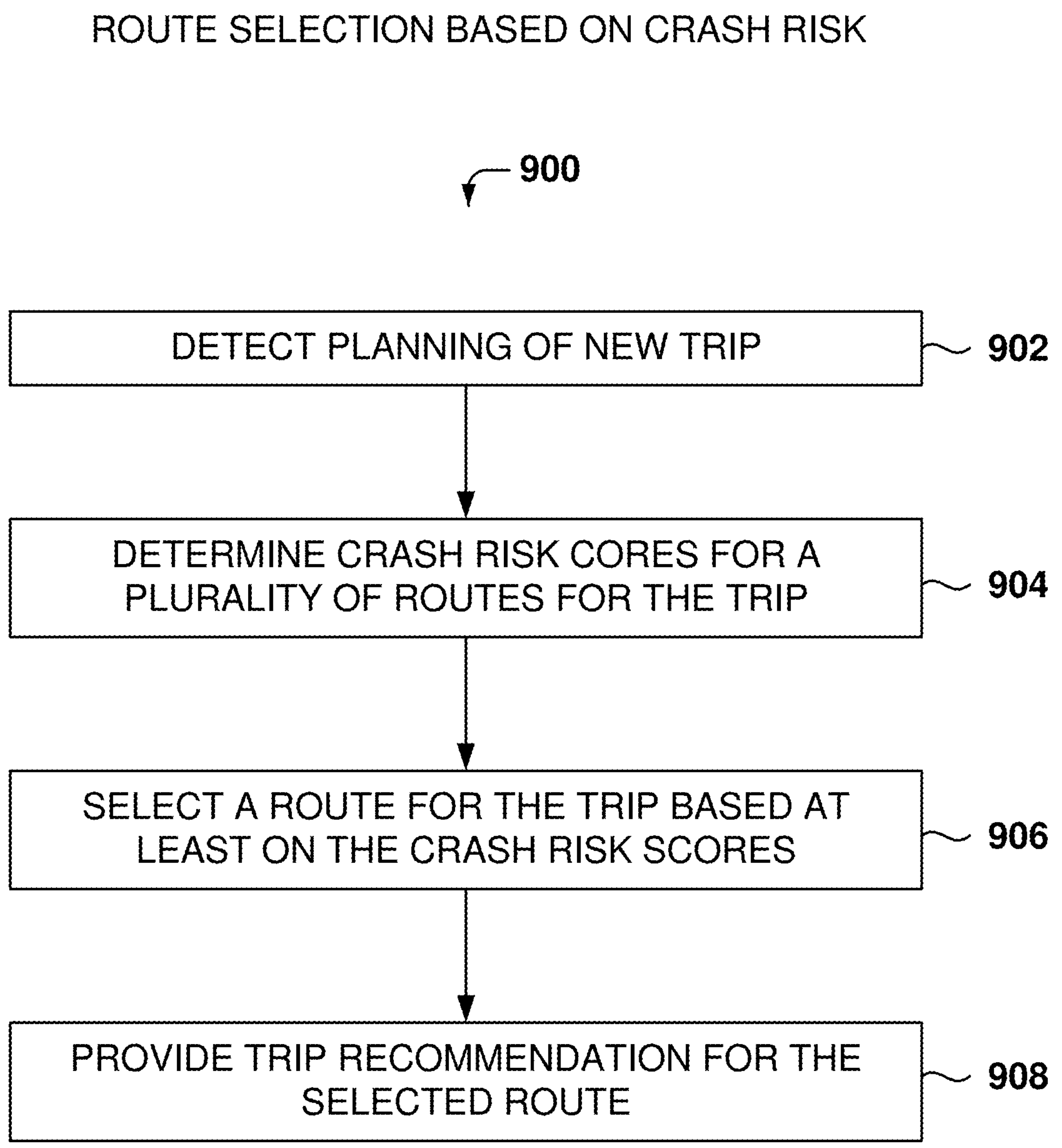
FIG. 9 is a flowchart of a method for route selection based on the crash risk score, according to some examples.

FIG. 9 is a flowchart of a method 900 for route selection based on the crash risk score, according to some examples. While the various operations in this flowchart are presented and described sequentially, one of ordinary skill will appreciate that some or all of the operations may be executed in a different order, be combined or omitted, or be executed in parallel.

At operation 902, the planning of a new trip is detected by identifying the initiation of a new trip planning process. This detection may involve monitoring inputs from a fleet management system, navigation system, user interface, or automated scheduling system. In some examples, the detection is triggered by a user input specifying a trip start and end location, or by a system-generated event indicating the need for a new trip. The detection process may also include gathering preliminary trip details, such as the type of vehicle, expected departure time, and cargo requirements.

From operation 902, the method flows to operation 904 to determine crash risk scores for a plurality of routes for the trip. At this stage, the method evaluates multiple potential routes for the planned trip and calculates crash risk scores for each route. The crash risk scores are determined based on a combination of factors, including historical crash data, environmental conditions, traffic patterns, and driver behavior metrics. In some examples, the method utilizes machine learning models trained on historical trip data to predict the relative likelihood of crashes for each route. The crash risk scores may be calculated using features such as maximum speed limits, road type, weather conditions, and proximity to high-risk areas. The method may also incorporate real-time data that may affect the risk score, such as current traffic congestion or weather alerts.

From operation 904, the method flows to operation 906 to select a route for the trip, from the plurality of identified trip routes, based at least on the crash risk scores. At operation 904, the optimal route for the trip is selected by analyzing the crash risk scores and other relevant parameters. The selection process may involve ranking the routes based on their risk scores and applying additional criteria, such as travel time, fuel efficiency, or driver preferences. In some examples, the method uses a weighted scoring system to balance crash risk against other factors, ensuring that the selected route meets both safety and operational requirements. The selected route is finalized based on the analysis and is prepared for recommendation.

From operation 906, the method proceeds to operation 908, where a trip recommendation for the selected route is provided. At this stage, the method generates a trip recommendation that incorporates the selected route and delivers the recommendation to the user or fleet manager. The delivery may occur through a user interface, mobile application, or automated notification system.

In some examples, the recommendation includes supplementary contextual information, such as the reasoning behind the route selection, estimated travel time, and safety guidance for the trip. The recommendation may also feature visualizations, such as maps or charts, to assist the user in understanding the route and associated risk factors. In some examples, the recommended route is added to a turn-by-turn navigation system on the vehicle for the trip.

Figure 10:
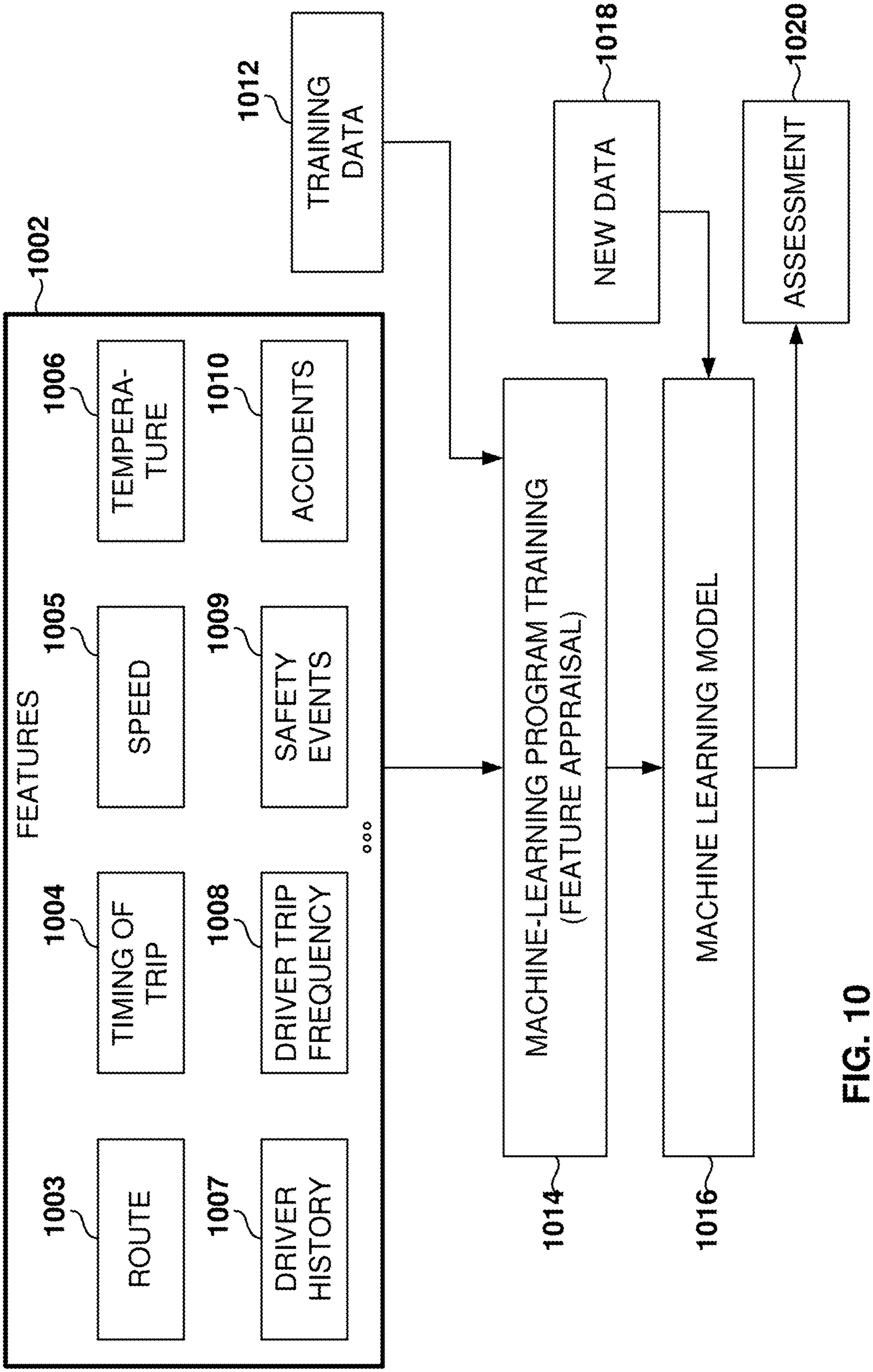
FIG. 10 illustrates the training and use of a machine-learning model 2416, according to some examples.

FIG. 10 illustrates the training and use of a machine-learning model 1016, according to some examples. In some examples, machine learning (ML) models 1016 are utilized to perform operations associated with calculating trip crash risk scores.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1016 from training data 1012 in order to make data-driven predictions or decisions expressed as outputs or assessments 1020. Although examples are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled, and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders.

In some examples, the ML model 1016 provides a trip crash risk score (e.g., a number from 1 to 100). In some examples, the ML model 1016 provides an organizational crash risk score based on the organizational-level data, such as safety records, crash history, and implemented safety measures.

The training data 1012 comprises examples of values for the features 1002. In some examples, the training data comprises labeled data with examples of values for the features 1002 and labels indicating the outcome, such as whether there was a crash during the trip or not.

The machine-learning algorithms utilize the training data 1012 to find correlations among identified features 1002 that affect the outcome. A feature 1002 is an individual measurable property of a phenomenon being observed. The concept of a feature is related to that of an explanatory variable used in statistical techniques such as linear regression. Choosing informative, discriminating, and independent features is beneficial for the effective operation of ML in pattern recognition, classification, and regression. Features may be of different types, such as numeric, string, categorical, and graph. A categorical feature is a feature that may be assigned a value from a plurality of predetermined possible values (e.g., this animal is a dog, a cat, or a bird).

In one example, the features 1002 may be of different types and may include one or more of route 1003, timing of the trip 1004, speed during the trip 1005 (e.g., maximum speed during the trip, percentage of time driving above the speed limit), temperature 1006 during the trip (e.g., temperature at the beginning of the trip, temperature at the end of the trip, highest temperature during the trip, lowest temperature during the trip), driver history data 1007, driver trip frequency 1008, safety events 1009, accidents 1010 during trips, etc.

In some examples, any combination of the following features may be used for the ML model:

Maximum Speed Reached During a Trip: The highest speed recorded during a trip, which can indicate the type of driving behavior.

Instances of Speeding: The number of times a driver exceeded the speed limit during a trip.

Temperature at the Start of the Trip: The environmental temperature when the trip began, which may influence driving conditions.

Driver's History of Safety Events: A record of past safety-related incidents, such as crashes, harsh braking, or distracted driving.

Driver's Frequency of Trips: The number of trips completed by the driver within a specific timeframe, such as the last day.

Total Driving Distance Over a Period: The cumulative distance driven by the driver across trips within a defined period, such as the past 30 days.

Seatbelt Usage: Whether the driver consistently wore a seatbelt during trips.

Distracted Driving Events: Instances where the driver was engaged in activities such as phone usage or other distractions while driving.

Tailgating Incidents: The frequency of events where the driver followed another vehicle too closely.

Organizational Safety Practices: Factors such as whether the organization uses rear-facing cameras or has a history of crashes or drowsy driving incidents.

These features can be used individually or in combination to train the machine learning model to infer risk at the trip, driver, or organizational level. It is noted that these features are examples and do not describe every possible embodiment. Other implementations may utilize different parameters, fewer parameters, additional parameters, combine parameters, etc. The examples illustrated in FIG. 10 should therefore not be interpreted to be exclusive or limiting, but rather illustrative.

During training 1014, the ML program, also referred to as ML algorithm or ML tool, analyzes the training data 1012 based on identified features 1002 and configuration parameters defined for the training. The result of the training 1014 is the ML model 1016, which is capable of taking inputs to produce assessments.

Training an ML algorithm involves analyzing large amounts of data (e.g., from several gigabytes to a terabyte or more) in order to find data correlations. The ML algorithms utilize the training data 1012 to find correlations among the identified features 1002 that affect the outcome or assessment 1020. In some examples, the training data 1012 includes labeled data, which is known data for one or more identified features 1002 and one or more outcomes, such as crashes or safety events.

The ML algorithms usually explore many possible functions and parameters before finding what the ML algorithms identify to be the best correlations within the data; therefore, training may make use of large amounts of computing resources and time.

When the ML model 1016 is used to perform an assessment, new data 1018 is provided as input to the ML model 1016, and the ML model 1016 generates the assessment 1020 as output. For example, when information about a trip is provided (e.g., start point, such as coordinates or address; end point, driver information, organization information, weather information for the trip, vehicle), the ML model 1016 provides a crash risk score. It is noted that any combination of one or more of the aforementioned inputs may be used for different implementations to calculate the crash risk score.

In some examples, results obtained by the model 1016 during operation (e.g., assessment 1020 produced by the model in response to inputs) are used to improve the training data 1012, which is then used to generate a newer version of the model. Thus, a feedback loop is formed to use the results obtained by the model to improve the model.

Figure 11:
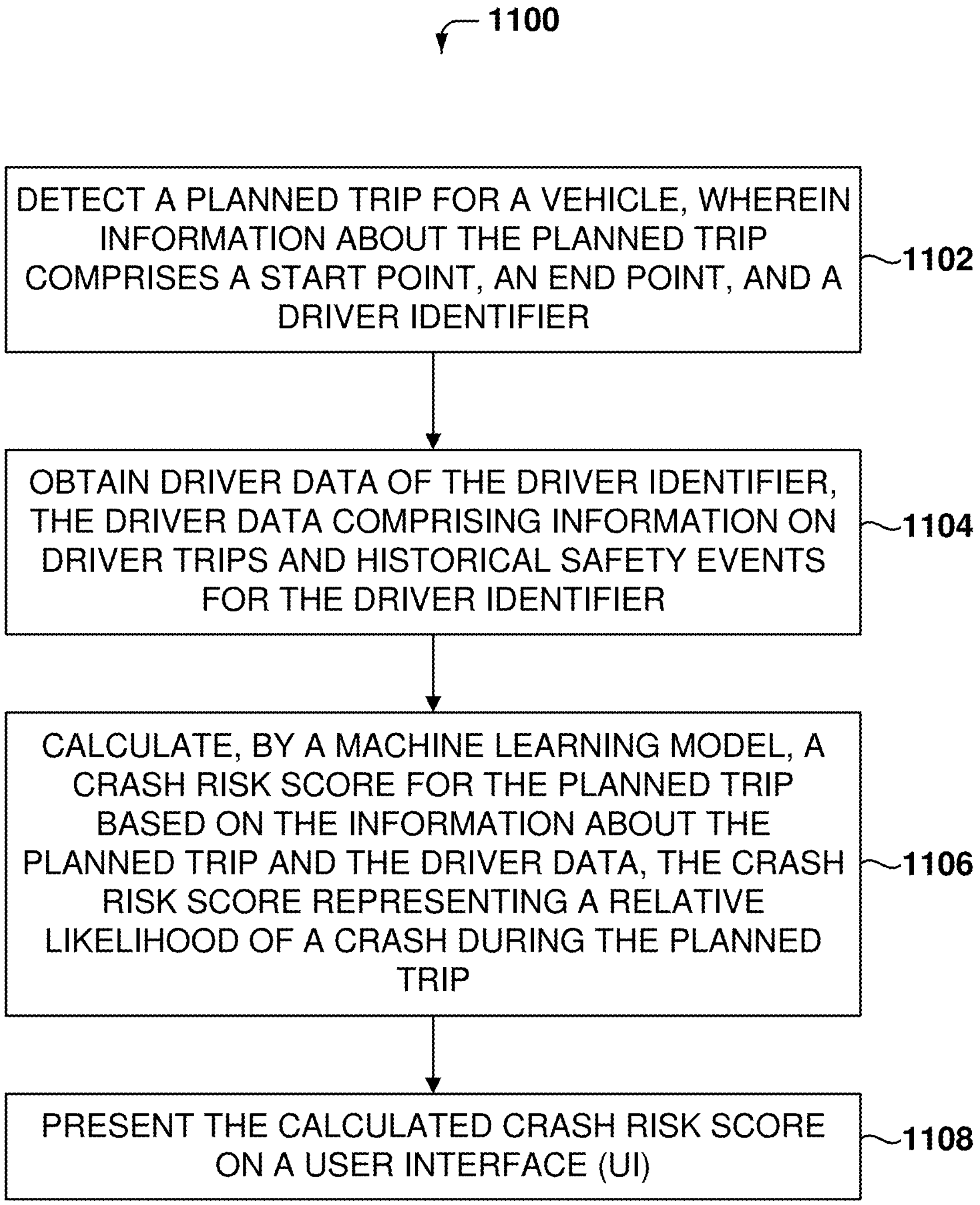
FIG. 11 is a flowchart of a method for providing risk insights based on crash risk scores, according to some examples.

FIG. 11 is a flowchart of a method 1100 for providing risk insights based on crash risk scores, according to some examples. While the various operations in this flowchart are presented and described sequentially, one of ordinary skill will appreciate that some or all of the operations may be executed in a different order, be combined or omitted, or be executed in parallel.

At operation 1102, a planned trip for a vehicle is detected. Information about the planned trip includes a start point, an end point, and a driver. The detection process may involve monitoring inputs from a fleet management system, navigation system, or user interface. In some examples, the detection is triggered by a user input specifying the trip details or by a system-generated event indicating the need for a new trip. The detection process may also include gathering preliminary trip details, such as the type of vehicle, expected departure time, and cargo requirements.

From operation 1102, the method flows to operation 1104 to obtain driver data of the driver. The driver data comprises information on driver trips and historical safety events for the driver. In some examples, the driver data includes records of past safety-related incidents, such as crashes, harsh braking, or distracted driving. Additional data points may include the driver's frequency of trips within a specific timeframe, such as the last day, and cumulative driving distance over a defined period, such as the past 30 days. This data is used to provide a comprehensive view of the driver's historical behavior and safety trends.

From operation 1104, the method flows to operation 1106 to calculate, by a machine learning model 1016, a crash risk score for the planned trip. The crash risk score is calculated based on the information about the planned trip and the driver data obtained in the previous operation. The crash risk score represents a relative likelihood of a crash during the planned trip. In some examples, the machine learning model utilizes features such as maximum speed reached during a trip, instances of speeding, and environmental conditions like temperature at the start of the trip. The model may also incorporate driver-specific historical data, including records of various safety events such as tailgating, phone usage while driving, harsh braking, sharp turns, seatbelt usage, distracted driving incidents, and rolling stops. The machine learning model 1016 is trained using labeled data, historical trip data, driver data, and crash outcomes to infer the crash risk score.

From operation 1106, the method flows to operation 1108 to present the calculated crash risk score on a user interface (UI). The UI is configured to display the crash risk score along with contributing factors, such as driver behavior metrics, trip characteristics, and environmental conditions. In some examples, the UI provides a visual representation of the crash risk score, including graphs, charts, or heatmaps, to contextualize the score and highlight areas for improvement. The presentation of the crash risk score enables fleet managers to monitor ongoing operations and make informed decisions regarding safety interventions.

The method 1100 leverages data-driven insights to infer and mitigate risk. By analyzing historical and real-time data, the machine learning model identifies patterns and trends that correlate with unsafe driving behaviors and conditions. The sequence of operations ensures a comprehensive assessment of risk for the planned trip, providing actionable insights for fleet management systems.

In view of the disclosure above, various examples are set forth below. It should be noted that one or more features of an example, taken in isolation or combination, should be considered within the disclosure of this application.

Example 1. A computer-implemented method comprising: detecting a planned trip for a vehicle, wherein information about the planned trip comprises a start point, an end point, and a driver identifier; obtaining driver data of the driver identifier, the driver data comprising information on driver trips and historical safety events for the driver identifier; calculating, by a machine learning model, a crash risk score for the planned trip based on the information about the planned trip and the driver data, the crash risk score representing a relative likelihood of a crash during the planned trip; and presenting the calculated crash risk score on a user interface (UI).

Example 2. The method of Example 1, further comprising: obtaining environmental data associated with the planned trip, the environmental data including at least one of weather conditions, road type, or traffic patterns, wherein the information about the planned trip further comprises the environmental data.

Example 3. The method of any one or more of Examples 1-2, further comprising: aggregating crash risk scores from a plurality of trips associated with the driver identifier to generate a driver-specific risk profile, wherein the driver-specific risk profile includes metrics for historical crash likelihood, frequency of safety events, and driving behavior trends.

Example 4. The method of any one or more of Examples 1-3, further comprising: determining a plurality of routes for the planned trip; determining a route risk score for each route from the plurality of routes; and selecting the route from the plurality of routes with a lowest route risk.

Example 5. The method of any one or more of Examples 1-4, further comprising: adding the selected route to a turn-by-turn navigation system.

Example 6. The method of any one or more of Examples 1-5, further comprising: obtaining organizational-level data, the organizational-level data including aggregated safety records, crash history, and implemented safety measures; calculating, by the machine learning model, an organizational crash risk score based on the organizational-level data; and presenting the organizational crash risk score on the UI.

Example 7. The method of any one or more of Examples 1-6, further comprising: generating actionable recommendations based on the calculated crash risk score, the actionable recommendations including targeted coaching or training for the driver identifier; and presenting the actionable recommendations on the UI.

Example 8. The method of any one or more of Examples 1-7, wherein the UI is configured to display contributing factors to the crash risk score, including driver behavior metrics, trip characteristics, and environmental conditions.

Example 9. The method of any one or more of Examples 1-8, wherein the machine learning model is trained using labeled data comprising historical trip data, driver data, and crash outcomes.

Example 10. The method of any one or more of Examples 1-9, further comprising: generating a visual representation of the crash risk score, the visual representation including graphs, charts, or heatmaps; and presenting on the UI the visual representation of the crash risk score.

Example 11. A system comprising: a memory comprising instructions; and one or more computer processors, the instructions, when executed by the one or more computer processors, causing the system to perform operations comprising: detecting a planned trip for a vehicle, wherein information about the planned trip comprises a start point, an end point, and a driver identifier; obtaining driver data of the driver identifier, the driver data comprising information on driver trips and historical safety events for the driver identifier; calculating, by a machine learning model, a crash risk score for the planned trip based on the information about the planned trip and the driver data, the crash risk score representing a relative likelihood of a crash during the planned trip; and presenting the calculated crash risk score on a user interface (UI).

Example 12. The system of Example 11, wherein the instructions further cause the one or more computer processors to perform operations comprising: obtaining environmental data associated with the planned trip, the environmental data including at least one of weather conditions, road type, or traffic patterns, wherein the information about the planned trip further comprises the environmental data.

Example 13. The system of any one or more of Examples 11-12, wherein the instructions further cause the one or more computer processors to perform operations comprising: aggregating crash risk scores from a plurality of trips associated with the driver identifier to generate a driver-specific risk profile, wherein the driver-specific risk profile includes metrics for historical crash likelihood, frequency of safety events, and driving behavior trends.

Example 14. The system of any one or more of Examples 11-13, wherein the instructions further cause the one or more computer processors to perform operations comprising: determining a plurality of routes for the planned trip; determining a route risk score for each route from the plurality of routes; and selecting the route from the plurality of routes with a lowest route risk.

Example 15. The system of any one or more of Examples 11-14, wherein the instructions further cause the one or more computer processors to perform operations comprising: adding the selected route to a turn-by-turn navigation system.

Example 16. A non-transitory machine-readable storage medium including instructions that, when executed by a machine, cause the machine to perform operations comprising: detecting a planned trip for a vehicle, wherein information about the planned trip comprises a start point, an end point, and a driver identifier; obtaining driver data of the driver identifier, the driver data comprising information on driver trips and historical safety events for the driver identifier; calculating, by a machine learning model, a crash risk score for the planned trip based on the information about the planned trip and the driver data, the crash risk score representing a likelihood of a crash during the planned trip; and presenting the calculated crash risk score on a user interface (UI).

Example 17. The non-transitory machine-readable storage medium of Example 16, wherein the machine further performs operations comprising: obtaining environmental data associated with the planned trip, the environmental data including at least one of weather conditions, road type, or traffic patterns, wherein the information about the planned trip further comprises the environmental data.

Example 18. The non-transitory machine-readable storage medium of any one or more of Examples 16-17, wherein the machine further performs operations comprising: aggregating crash risk scores from a plurality of trips associated with the driver identifier to generate a driver-specific risk profile, wherein the driver-specific risk profile includes metrics for historical crash likelihood, frequency of safety events, and driving behavior trends.

Example 19. The non-transitory machine-readable storage medium of any one or more of Examples 16-18, wherein the machine further performs operations comprising: determining a plurality of routes for the planned trip; determining a route risk score for each route from the plurality of routes; and selecting the route from the plurality of routes with a lowest route risk.

Example 20. The non-transitory machine-readable storage medium of any one or more of Examples 16-19, wherein the machine further performs operations comprising: adding the selected route to a turn-by-turn navigation system.

Figure 12:
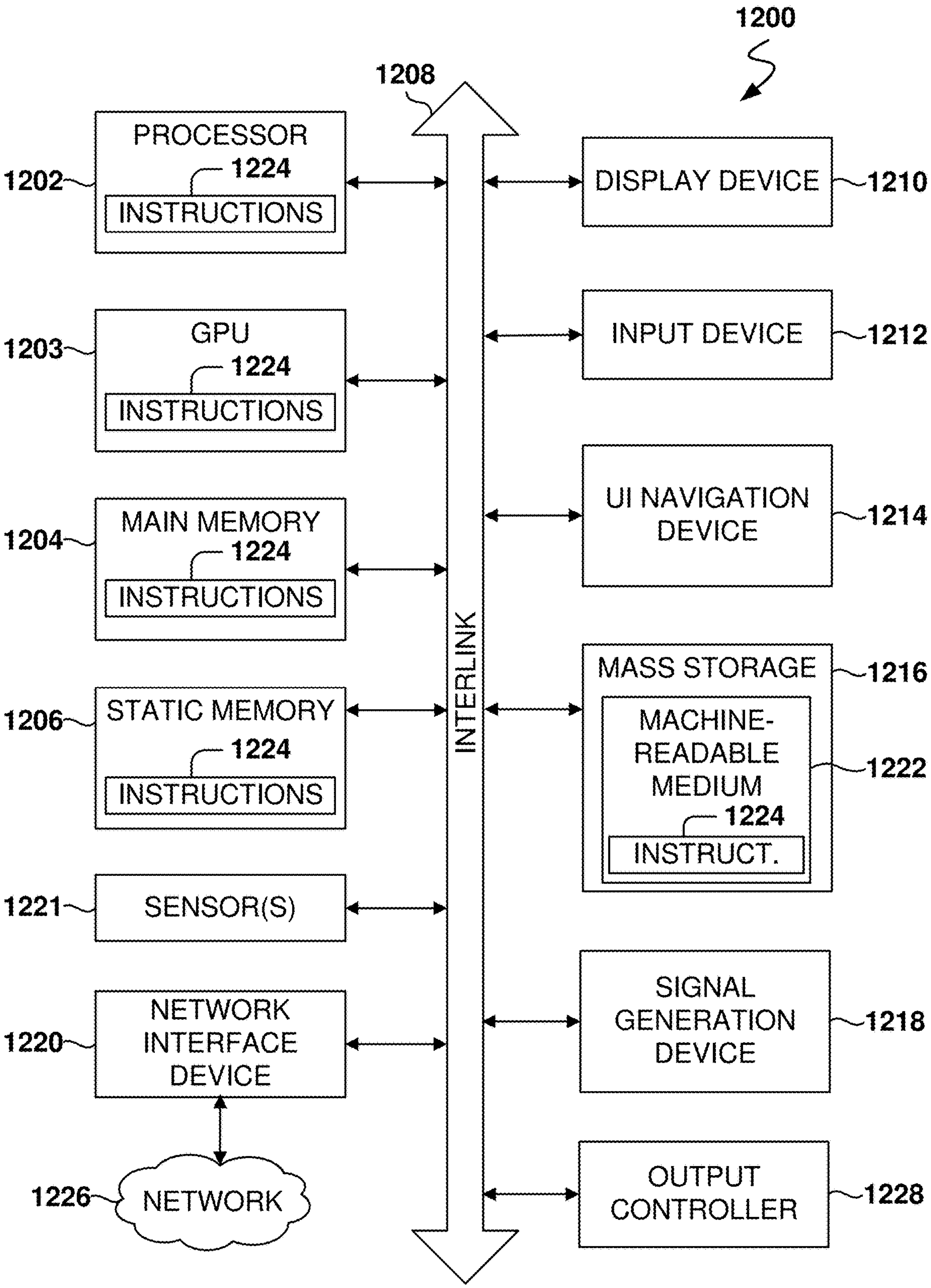
FIG. 12 is a block diagram illustrating an example of a machine upon or by which one or more process examples described herein may be implemented or controlled.

FIG. 12 is a block diagram illustrating an example of a machine 1200 upon by which one or more process examples described herein may be implemented or controlled. In alternative examples, the machine 1200 may operate as a standalone device or be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1200 (e.g., computer system) may include a hardware processor 1202 (e.g., a central processing unit (CPU), a hardware processor core, or any combination thereof), a graphics processing unit (GPU 1203), a main memory 1204, and a static memory 1206, some or all of which may communicate with each other via an interlink 1208 (e.g., bus). The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device 1216 (e.g., drive unit), a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1202 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1202 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1202 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1202 may be emulated in software, running on a physical processor, as a virtual processor or virtual circuit. The virtual processor may behave like an independent processor but is implemented in software rather than hardware.

The mass storage device 1216 may include a machine-readable medium 1222 on which one or more sets of data structures or instructions 1224 (e.g., software) embodying or utilized by any of the techniques or functions described herein. The instructions 1224 may also reside, completely or at least partially, within the main memory 1204, within the static memory 1206, within the hardware processor 1202, or the GPU 1203 during execution thereof by the machine 1200. For example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium or multiple media (e.g., a centralized or distributed database and associated caches and servers) configured to store one or more instructions 1224.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 1224 for execution by the machine 1200 and that causes the machine 1200 to perform any one or more of the techniques of the present disclosure or that is capable of storing, encoding, or carrying data structures used by or associated with such instructions 1224. Non-limiting machine-readable medium examples may include solid-state memories and optical and magnetic media. For example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 1224 may be transmitted or received over a communications network 1226 using a transmission medium via the network interface device 1220. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1224 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

training a machine learning model using training data with label data comprising historical trip data, driver history data, and accidents associated with the historical trip data;

detecting a planned trip for a vehicle, wherein information about the planned trip comprises a start point, an end point, and a driver identifier;

obtaining driver data of the driver identifier, the driver data comprising information on driver trips and historical safety events for the driver identifier;

calculating, by the machine learning model, a crash risk score for the planned trip based on input comprising the start point of the planned trip, the end point of the planned trip, the driver data, weather information, and vehicle information, the crash risk score representing a relative likelihood of a crash during the planned trip; and presenting the calculated crash risk score on a user interface (UI).

2. The method as recited in claim 1, wherein the input for the machine learning model further comprises traffic patterns for the planned trip, wherein the weather information comprises temperature at a beginning of the planned trip and temperature at an end of the planned trip.

3. The method of claim 1, further comprising:

aggregating crash risk scores from a plurality of trips associated with the driver identifier to generate a driver-specific risk profile, wherein the driver-specific risk profile includes metrics for historical crash likelihood, frequency of safety events, and driving behavior trends.

4. The method of claim 1, further comprising:

determining a plurality of routes for the planned trip;

determining a route risk score for each route from the plurality of routes; and selecting the route from the plurality of routes with a lowest route risk.

5. The method as recited in claim 4, further comprising:

adding the selected route to a turn-by-turn navigation system.

6. The method of claim 1, further comprising:

obtaining organizational-level data, the organizational-level data including aggregated safety records, crash history, and implemented safety measures;

calculating, by the machine learning model, an organizational crash risk score based on the organizational-level data; and presenting the organizational crash risk score on the UI.

7. The method of claim 1, further comprising:

generating actionable recommendations based on the calculated crash risk score, the actionable recommendations including targeted coaching or training for the driver identifier; and presenting the actionable recommendations on the UI.

8. The method as recited in claim 1, wherein the UI is configured to display contributing factors to the crash risk score, including driver behavior metrics, trip characteristics, and environmental conditions.

9. The method as recited in claim 1, wherein the driver history data in the training data comprises instances of speeding, history of safety events for the driver, frequency of trips for the driver, total driving distance of the driver over a period, and number of distracted driving events of the driver.

10. The method of claim 1, further comprising:

generating a visual representation of the crash risk score, the visual representation including graphs, charts, or heatmaps; and presenting on the UI the visual representation of the crash risk score.

11. A system comprising:

a memory comprising instructions; and one or more computer processors, the instructions, when executed by the one or more computer processors, causing the system to perform operations comprising:

training a machine learning model using training data with label data comprising historical trip data, driver history data, and accidents associated with the historical trip data;

detecting a planned trip for a vehicle, wherein information about the planned trip comprises a start point, an end point, and a driver identifier;

obtaining driver data of the driver identifier, the driver data comprising information on driver trips and historical safety events for the driver identifier;

calculating, by the machine learning model, a crash risk score for the planned trip based on input comprising the start point of the planned trip, the end point of the planned trip, the driver data, weather information, and vehicle information, the crash risk score representing a relative likelihood of a crash during the planned trip; and presenting the calculated crash risk score on a user interface (UI).

12. The system as recited in claim 11, wherein the input for the machine learning model further comprises traffic patterns for the planned trip, wherein the weather information comprises temperature at the beginning of the planned trip and temperature at the end of the planned trip.

13. The system as recited in claim 11, wherein the instructions further cause the one or more computer processors to perform operations comprising:

aggregating crash risk scores from a plurality of trips associated with the driver identifier to generate a driver-specific risk profile, wherein the driver-specific risk profile includes metrics for historical crash likelihood, frequency of safety events, and driving behavior trends.

14. The system as recited in claim 11, wherein the instructions further cause the one or more computer processors to perform operations comprising:

determining a plurality of routes for the planned trip;

determining a route risk score for each route from the plurality of routes; and selecting the route from the plurality of routes with a lowest route risk.

15. The system as recited in claim 14, wherein the instructions further cause the one or more computer processors to perform operations comprising:

adding the selected route to a turn-by-turn navigation system.

16. A non-transitory machine-readable storage medium including instructions that, when executed by a machine, cause the machine to perform operations comprising:

training a machine learning model using training data with label data comprising historical trip data, driver history data, and accidents associated with the historical trip data;

detecting a planned trip for a vehicle, wherein information about the planned trip comprises a start point, an end point, and a driver identifier;

obtaining driver data of the driver identifier, the driver data comprising information on driver trips and historical safety events for the driver identifier;

calculating, by the machine learning model, a crash risk score for the planned trip based on input comprising the start point of the planned trip, the end point of the planned trip, the driver data, weather information, and vehicle information, the crash risk score representing a relative likelihood of a crash during the planned trip; and presenting the calculated crash risk score on a user interface (UI).

17. The non-transitory machine-readable storage medium as recited in claim 16, wherein the input for the machine learning model further comprises traffic patterns for the planned trip, wherein the weather information comprises temperature at the beginning of the planned trip and temperature at the end of the planned trip.

18. The non-transitory machine-readable storage medium as recited in claim 16, wherein the machine further performs operations comprising:

aggregating crash risk scores from a plurality of trips associated with the driver identifier to generate a driver-specific risk profile, wherein the driver-specific risk profile includes metrics for historical crash likelihood, frequency of safety events, and driving behavior trends.

19. The non-transitory machine-readable storage medium as recited in claim 16, wherein the machine further performs operations comprising:

determining a plurality of routes for the planned trip;

determining a route risk score for each route from the plurality of routes; and selecting the route from the plurality of routes with a lowest route risk.

20. The non-transitory machine-readable storage medium as recited in claim 19, wherein the machine further performs operations comprising:

adding the selected route to a turn-by-turn navigation system.

* * * * *